Oct. 23, 1934.  C. E. CHRISTOPHERSON  1,977,871

SNOWPLOW

Filed Sept. 24, 1932  5 Sheets-Sheet 1

Inventor:
Calmer E. Christopherson
By Thorpe, Jackson, Bretcher + Wiener
Attys.

Oct. 23, 1934. C. E. CHRISTOPHERSON 1,977,871
SNOWPLOW
Filed Sept. 24, 1932   5 Sheets-Sheet 2

Inventor:
Catmer E. Christopherson

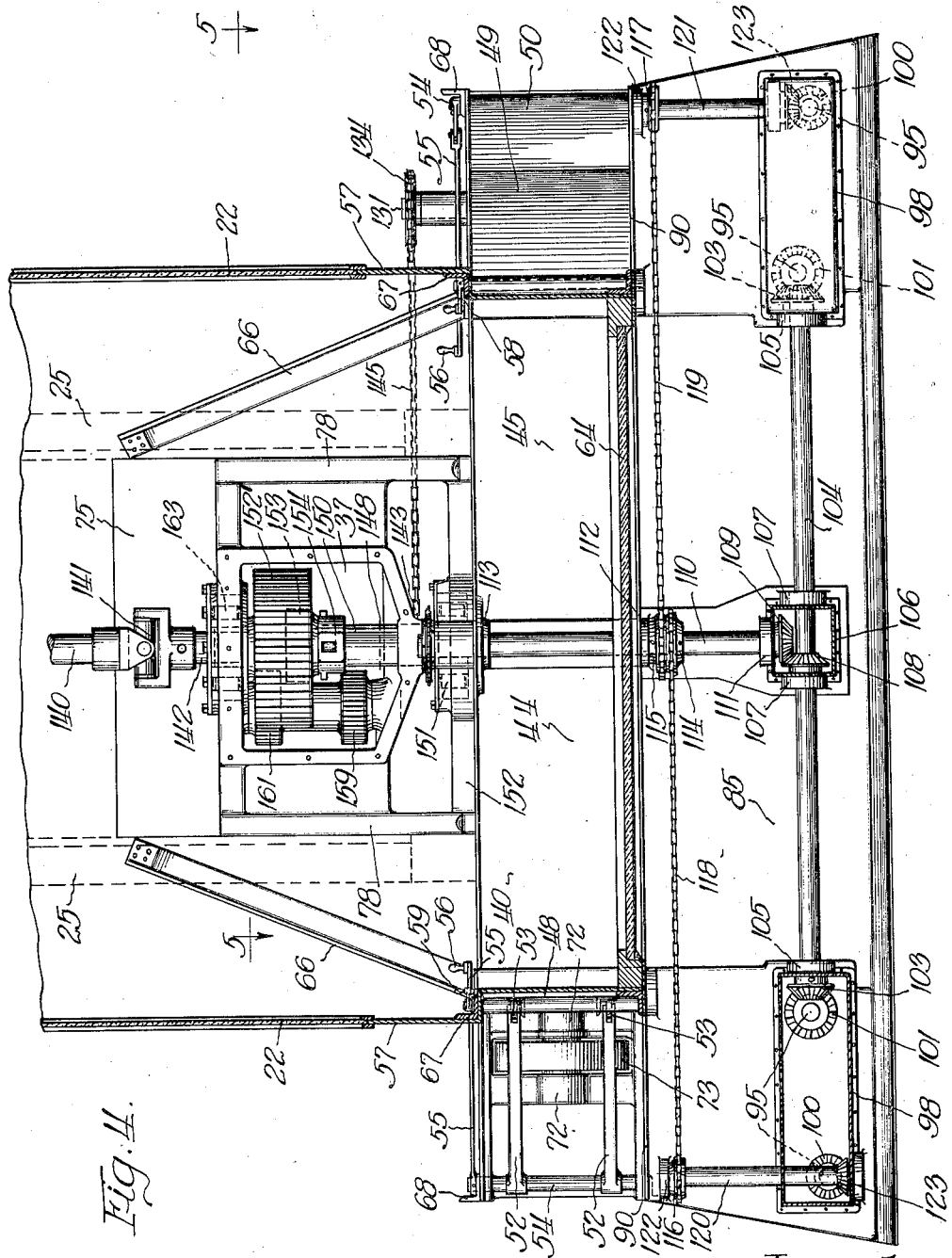

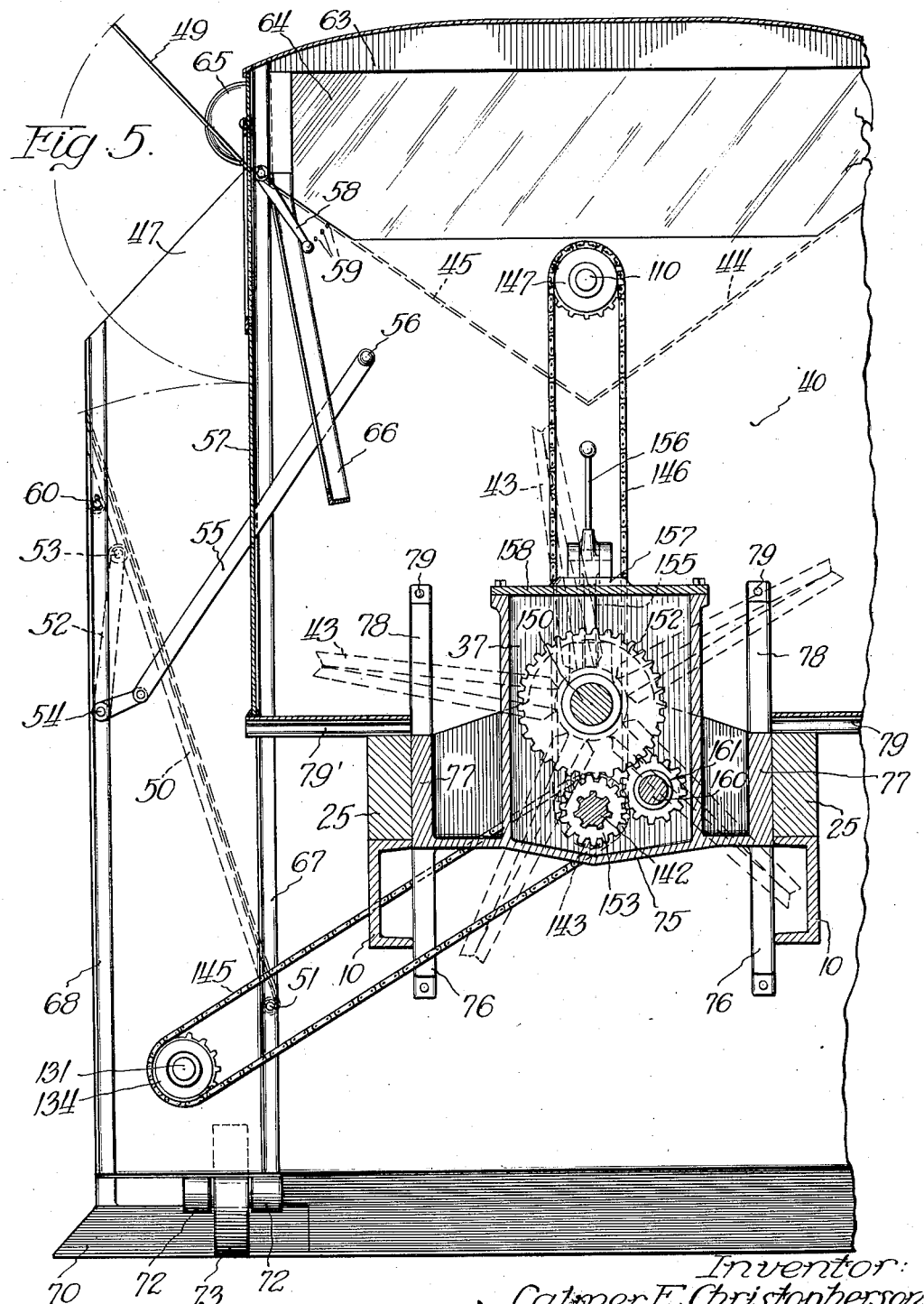

Oct. 23, 1934.　　　C. E. CHRISTOPHERSON　　　1,977,871
SNOWPLOW
Filed Sept. 24, 1932　　　5 Sheets—Sheet 5

Inventor:
Calmer E. Christopherson
By Drum, Jackson, Butcher & Wiener
Attys.

Patented Oct. 23, 1934

1,977,871

UNITED STATES PATENT OFFICE 1,977,871

SNOWPLOW

Calmer E. Christopherson, Chicago, Ill., assignor of one-half to Edward L. Bass, Chicago, Ill.

Application September 24, 1932, Serial No. 634,660

9 Claims. (Cl. 37—43)

This invention relates to snow plows, and more particularly to snow plows adapted to be supported upon the chassis of a small truck or tractor.

In the preferred embodiment of the invention, the snow plow is adapted to be mounted at the rear end of a small truck, being directly carried by the chassis of the truck and having means cooperating therewith for raising and lowering the plow with respect to the truck, to accommodate movement of the plow over uneven ground, packed snow or the like.

The truck has associated therewith a cab mounted directly adjacent the plow on the chassis and containing the operating mechanism for the plow and the truck. The truck, in addition to its regular motive power, is provided with an auxiliary engine disposed in the cab portion and designed for operating the plow, the truck engine also being operated from the cab for providing the motive power for the truck and the plow. The auxiliary engine provides for the operation of the snow plow mechanism, including the blower or fan, and the beaters to be hereinafter described, through a suitable transmission.

The snow plow itself comprises a substantially rectangular housing enclosing a rotating multi-bladed fan, with diverging side and bottom walls having rotating beaters mounted thereon, the beaters being provided with sharp cutting edges adapted to bite into packed snow. The beaters and the fan are all operated from the auxiliary motor, there being suitable driving connections from the shaft to the beaters for driving all of the beaters from the driving shaft of the auxiliary engine. The transmission provides for speed control of the shaft, and also for reverse rotation of the fan.

The housing or drum for the fan is provided with two openings, disposed on opposite sides at the upper portion of the housing, which can be so controlled that the fan will blow the snow out of either side of the drum, depending upon the direction of the wind and the point at which it is desired to deposit the snow. The fan is provided with cutting edges along the blade portion, and also with a conical projection extending forwardly thereof for breaking up packed snow which may be pushed toward the fan.

One of the main features of the invention is the provision of the beaters for cutting up and biting into packed snow, in order to reduce the power necessary to drive the blower or fan, and for preventing jamming of packed snow about the fan blades. This reduction in power requirement of the engine, through use of the beaters and cutting fan blades, allows the use of a small four cylinder engine or the like, for driving the plow mechanism. The vertically extending beaters on opposite sides of the fan are varied in size, the outer beaters having less surface area in order to provide a better cutting and beating action, and are adapted to throw the cut snow into the path of the inner beaters, which direct the snow toward the rotating fan.

Another feature of the present invention is the mounting of the snow plow in the operator's cab at the rear end of the truck chassis, with means for operating the truck transmission, the auxiliary engine transmission, and the steering mechanism for the truck, all disposed within the cab and adapted to be operated by a single operator. The cab is fully enclosed and weather proof, and is provided with a wind shield directly over the fan housing allowing the operator to watch the operation of the plow and to direct the movements of the truck.

A further feature of the invention is the provision of a snow plow and associated operator's cab mounted upon a truck chassis and capable of being raised and lowered with respect thereto, this movement of the plow and cab with respect to the chassis not interfering with the operation of the plow mechanism. The provision of wheels beneath the snow plow proper helps to support its weight when the cab is raised from the truck chassis, and also maintains the tip portion of the scoop-shaped bottom wall above the ground.

A still further feature of the invention is the provision of a fan drum or housing having two outlets, which are individually operable according to the direction of the wind and the point at which it is desired to deposit the snow. The fan may be rotated in either direction, depending upon the opening which it is desired to use. The plow, in general, tapers from the flared open portion rearwardly, to allow its free passage between the cut snow banks.

Another feature of the snow plow of the present invention is the provision of a fan having removable blades provided with normally extending cutting edges, the blades being removable from the fan to facilitate sharpening of the cutting edges.

Another feature of the present invention resides in the driving connections between the drive shaft of the auxiliary engine and the beaters, whereby the beaters may be driven at the same speed as the fan, or at a different speed, or the beaters may be individually driven at different speeds, as desired. The gearing for these connections is fully enclosed to prevent the packing of snow and ice thereabout.

The diverging side walls and the sloping bottom of the fan housing serve as guides for conducting the snow from the beaters into the whirling fan to be forced out at either side of the device.

Other features and advantages of the invention will appear from the following detailed description, which, taken in connection with the accompanying drawings, will disclose to those skilled in the art the particular construction and operation of a preferred embodiment of the invention.

In the drawings:

Figure 4 is a sectional view taken substantially on the line 4—4 of Figure 3, and enlarged to show the details of the transmission connection between the drive shaft of the auxiliary motor and the plow mechanism;

Figure 5 is an enlarged sectional view taken substantially on the line 5—5 of Figure 4, showing in detail the door operating mechanism.

Figure 1:
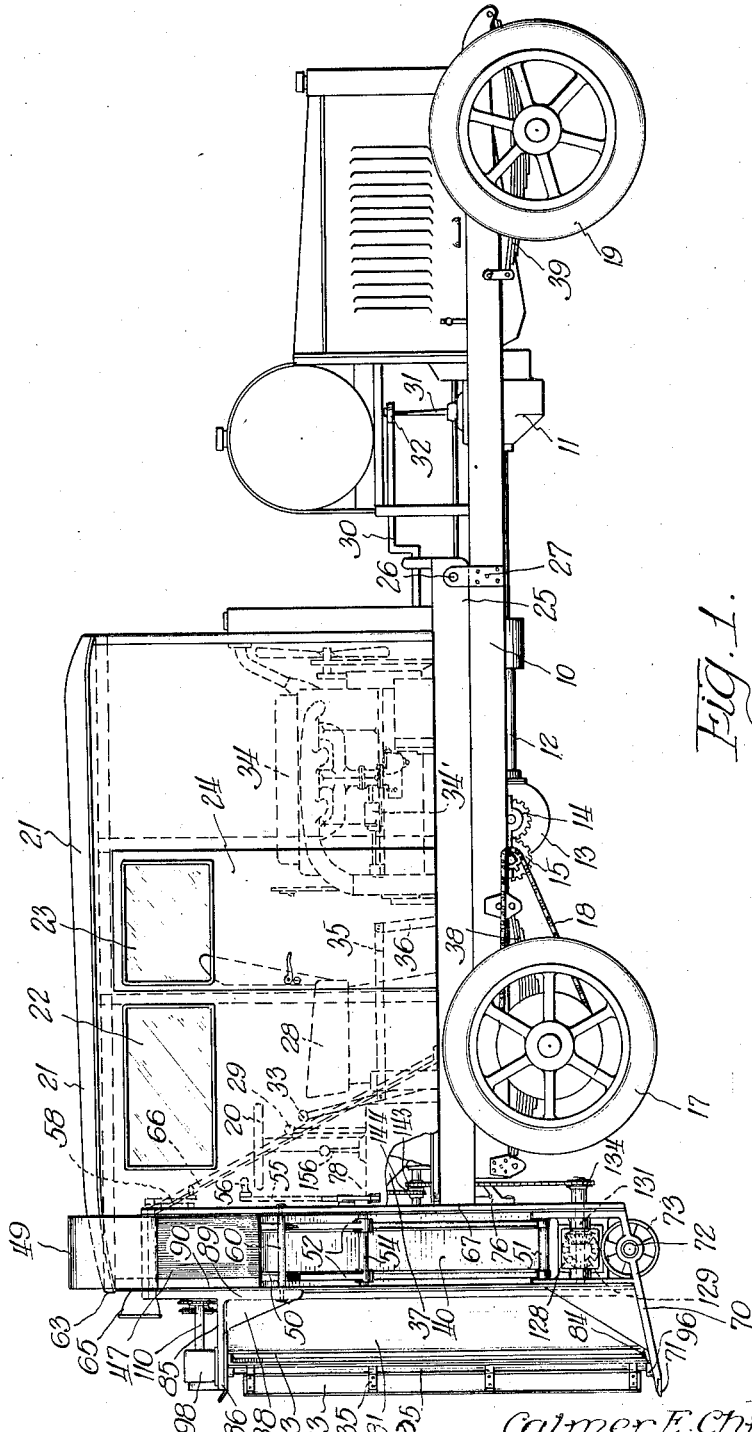
Figure 1 is a side elevational view of the truck with the snow plow and cab mounted thereon.

Referring now in detail to the drawings, in Figure 1 I have shown more or less diagrammatically a truck chassis indicated by the reference numeral 10, having a motor at the forward end thereof, and having the usual type of gear transmission 11 disposed between the drive shaft of the motor and the propeller shaft 12. From the propeller shaft 12, the motor is adapted to transmit power through the differential 13 to the gears 14 and 15, which gears are adapted to engage for transmitting drive from the differential to the rear driving wheels 17. This drive is transmitted to the wheels by the chain drive 18 carried by a sprocket mounted on the axle supporting the gear 15.

At the forward end of the truck chassis 10, there is provided a pair of dirigible steering wheels 19, which are adapted to be steered by a suitable steering wheel 20 mounted within the cab 21 supported upon the chassis 10. The cab 21 is fully enclosed, having the windows 22 and 23 therein, the window 23 being provided in the door 24 which provides for an entrance into the interior of the cab. The cab is supported upon floor sills 25, which at their forward end are pivoted upon a pivot 26 carried by the supporting brackets 27, which are welded or otherwise suitably secured to the chassis 10.

Within the cab 21 is disposed a driver's seat, indicated generally at 28, which faces rearwardly, and which is disposed adjacent the steering wheel 20. A gear shift lever 29 is connected, through the control rod 30, to the gear shift lever 31 extending from the transmission gear 11, and encircles the upper end thereof, as indicated at 32. This gear shift lever 29 is adapted to be operated for controlling the movement of the truck chassis, since the gear shift lever 31 controls the transmission 11 transmitting power from the engine of the truck through the driving connections or gears 14 and 15 to the rear wheels 17. It will be noted, that, by the provision of the second gear 15, that the ordinary forward speed of the transmission 11 will be effective to provide reverse speed upon the wheels 17 due to the change in direction of the shaft upon which the gear 15 is mounted. Thus, the wheels 17 will actually pull the truck rearwardly at a speed commensurate with the three forward speeds of the ordinary type of truck. In deep snow, the truck will be placed in low gear, while for shallow or powdery snow the higher speeds may be used.

It is thus apparent that the operator in the cab 21 can control the speed of the plow in direct proportion to the three driving speeds of the transmission 11, since these speeds are reversed by the gears 14 and 15. On the other hand, the reverse speed of the transmission 11 is adapted to cause the wheels 17 to rotate, urging the truck forwardly, or to the right, as viewed in Figure 1. Thus the operator has complete control of the movement of the truck from the cab 21.

A clutch lever 33 is mounted within the cab and adjacent the seat 28, and is operable to control the clutch of the auxiliary engine indicated generally at 34. The lever 33 is connected to the engine through the control rod 35 secured to a lever 36.

The drive shaft of the auxiliary engine 34 extends into a transmission housing indicated generally by the numeral 37, and shown more in detail in Figures 4 and 5. It will be noted that both engines are enclosed.

The wheels 17 and 19 of the truck chassis 10 are supported upon suitable axles carried by the springs 38 and 39 and it is apparent that any small type of automotive truck or tractor may be used for mounting the snow plow and associated cab.

Figure 2:
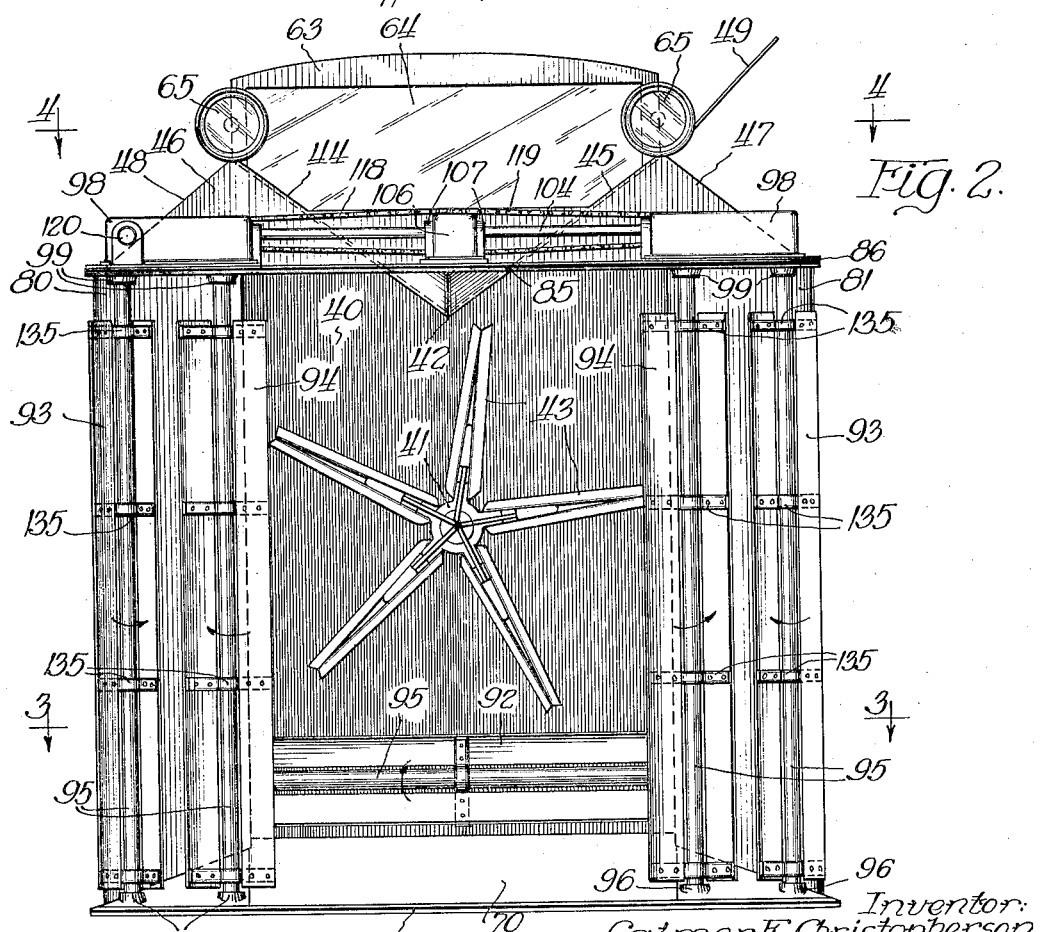
Figure 2 is an end elevational view of the snow plow.

The snow plow proper comprises a substantially rectangular housing, indicated by the numeral 40, which is adapted to contain the rotating fan or impeller indicated generally at 41, as shown in Figure 2. The housing 40 is provided with a W-shaped upper defining wall, which extends downwardly, as indicated at 42, to a point adjacent the end of the impeller or fan blade 43. The two defining walls of the V-shaped depression, namely walls 44 and 45, are adapted to lead to openings, shown more in detail in Figures 2 and 5, indicated by the numerals 46 and 47. These openings 46 and 47 are controlled by means of pivotally mounted doors 48 and 49.

The housing 40 is also provided with pivotally mounted side walls, shown more in detail in Figure 5, and indicated by the reference numeral 50, which are pivotally mounted as at 51, to the supporting frame structure. Rocker arms 52 are secured to pins 53 carried by suitable frame members on the side walls 50, and at their other ends are pivoted about pivots 54.

The arms 52 are adapted to be rocked about the pivots 54 by means of operating levers 55 having the operating knobs 56 extending through the side walls 57 into the interior of the cab 21, as shown in Figure 1. By moving the levers 56, the operator is enabled to move the side walls 50 either away from or toward the housing 40. Each side wall is individually controlled as shown in Figure 4.

The doors 48 and 49 are adapted to be swung to the position shown in Figure 5 by means of lever members 58 which are disposed within the interior portion of the cab and each of which has a projecting pin portion adapted to successively enter recesses 59 formed in a suitable locking plate for holding the door in any desired raised position. The side walls 50 are adapted to be held in either fully open or fully closed position, pins or rods 60 carried by the supporting frame structure being adapted to hold the doors against outward movement, as shown in Figure 5.

In this manner, the fan or impeller 41 may be rotated in either direction to deposit the snow through outlets 46 or 47 to the sides of the plow. When the fan is rotating in a clockwise direction, as shown in Figure 2, the snow is blown out through the outlet 46 past the door 48, while when the fan is rotating in a counter-clockwise direction, the snow will be blown out through opening 47 and past side wall 50 and door 49. The position of the door 49 will determine the point at which the snow will be deposited at the sides of the plow. It is thus apparent, that, by the provision of the reverse rotation of the fan, and by the provision of the two outlets on opposite sides of the plow construction, the fan may be so rotated as to deposit the snow upon either side of the plow, depending upon the direction of the wind and other conditions.

Disposed above the V-shaped groove formed in the fan housing 40, is a frame member 63, which forms the forward portion of the cab 21. This frame member 63 also forms a support for a wind shield 64, formed of glass or the like, which is in such position as to enable the operator sitting in the seat 28 to have a clear vision out over the fan housing and beater portion of the snow plow. A pair of head lights 65 may be mounted upon the frame portion 63 in order to provide light for night operation. These head lights may comprise the ordinary type of automobile head lights or the like, and may be connected to the electric battery of the truck or to a similar electrical supply source.

A pair of supporting angle irons or bracket members, indicated by the numeral 66, are adapted to extend from the upper portion of the fan housing 40 and the rear of the frame 63 downwardly to the sills 25 which support the cab 21. This serves to rigidly support the fan housing upon the sills 25 and in position with respect to the cab 21, since the lower portion of the housing is secured directly to the cab by means of frame members 67, which are secured to the side walls 57 of the cab 21, and outer angle members 68 which are provided for strengthening extending portions of the fan housing 40, and which serve as bearing supports for the levers 55 and pivots 54.

An angled casting 70, shown in detail in Figures 1 and 2, is secured to the rear portion of the fan housing 40 and to the extending portions of the angle members 67 and 68, and has its forwardly extending portion provided with a tip member 71 adapted to extend a slight distance above the ground or other surface over which the plow rides. This tip member or shearing edge 71 is removably mounted on the casting 70, so that it may be removed for sharpening or replacement. This casting also provides bearing supports 72 for wheels 73 which are disposed upon opposite sides of the fan housing 40 and beneath the housing to support the weight of the plow when the sills 25 are pivoted about the pivots 26 to raise the cab 21 from the truck chassis 10, when the wheels 17 of the chassis encounter ruts or the like. They also serve to prevent the tip 71 from digging into the ground upon an arched roadway.

Considering now the support of the cab and plow upon the chassis 10, in Figure 5 I have provided a sectional view showing a centrally disposed casting indicated generally by the numeral 75, which has a portion thereof adapted to form the transmission casing 37 for the auxiliary motor 34, and which is provided with annularly extending web portions 76 adapted to extend downwardly between the channel members 10 of the chassis of the truck, and which are secured to the rear portion of housing 40. These form guides for permitting relative movement of the cab and plow with respect to the chassis. The sills 25 are suitably secured to the flanged portions 77 of the casting 75, and the upwardly extending web portions 78 of the casting are secured to the rear wall of the housing 40 of the plow, as by means of a plurality of bolts 79. Also, the angle members 79' defining the lower edge of the cab portion 21 of the truck are adapted to extend over the sills 25, and are secured thereto and also to the extending portions 78 of the casting 75. In this manner, the snow plow housing is normally secured to the sills 25 which support the cab 21, and also the transmission and other portions of the auxiliary engine 34 are rigidly secured thereto, thus providing a rigid construction which may be raised or lowered by any suitable manual or automatic means, such as by a geared connection with lifting mechanism operated by the truck or engine, or with lifting mechanism or screw jack means operated by the auxiliary engine 34, or by hydrostatic means, as desired. A governor 34', shown as a suction type of governor placed on the intake manifold, although other types, such as centrifugal governors, may be used, is provided for governing the speed and thereby the power of the engine for adapting the power of the engine to drifts of different hardness or density.

Figure 3:
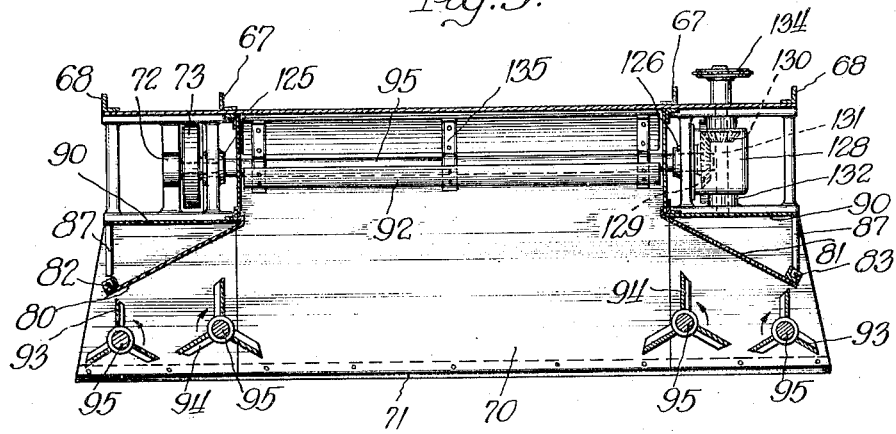
Figure 3 is a sectional elevation taken substantially on the line 3—3 of Figure 2 looking in the direction indicated by the arrows.

Considering now in detail the diverging wing portions extending outwardly from the fan housing 40, as shown in Figure 3, these wing portions comprise the flat vertically extending members 80 and 81, which have inturned lip portions extending over the outer corner of the fan housing for securing the inner edge of the walls 80 and 81 thereto. The outer edges of the walls 80 and 81 are secured to vertically extending angle members 82 and 83, which are secured, as shown in Figure 1, to the upper gear supporting casting indicated generally by the numeral 85, and which includes the horizontally extending portion 86 to which the upper end of the angle members 82 and 83 are secured. The lower end of the members 82 and 83 are secured to the inclined portion of the casting 70, as indicated at 84.

Web portions 87 are formed integral with the casting 70, and serves to reenforce the casting to prevent buckling of the same due to pressure upon the tip portion 71, which might tend to bend the inclined portion of the casting 70 upwardly. Similarly, the casting 85 is provided with a web portion 88, extending between the horizontally extending portion 86 of the casting and the vertically extending portion 89 thereof, this portion 89 being secured to the forward wall 90 of the fan housing. These diverging walls 80 and 81 serve to define the width of the cut effected by the plow, and a plurality of beaters are disposed forwardly of the walls 80 and 81 to cut any packed snow which the plow may encounter and to throw it centrally toward the rotating impeller 41.

The beaters, which in the preferred embodiment of the invention, are five in number, comprise a lower horizontally mounted beater member indicated generally at 92, and two pairs of vertically extending beaters 93 and 94. It will be noted that the surface area of the beaters 93 is less than the surface area of the beaters 94, to impose less torque upon the beaters while providing a better cutting and beating action for packed snow encountered along the edges of the plow. The beaters all comprise centrally disposed shaftmembers 95, which, in the case of the vertically extending beaters 93 and 94, are engaged at their lower ends in suitable bearing supports 96 formed in the casting 70. At their upper ends the shafts 95 extend through the housing or casting 85, and into suitable gear housings 98 mounted thereon. Suitable bearing collars 99 are provided on the underside of the casting 85, in order to support the upper end of the shaft 95.

Considering now in detail Figure 4, which is an enlarged view showing the manner of driving the beaters 93 and 94, each of the shafts 95 is provided at its upper end with a bevel gear, the outer beaters 93 having their shafts 95 provided with bevel gears 100, and the inner beaters 94 having their shafts provided with bevel gears 101. The gears 101 of the beaters 94 are adapted to be engaged by corresponding bevel gears 103 carried by a shaft 104 which extends laterally across the top of the casting 85. Suitable bearing supports 105 are provided in the casing or housings 98 for supporting the ends of the shaft 104. At its center, the shaft 104 extends through a gear case housing 106, which is provided with a pair of bearing supports 107 for supporting the central portion of the shaft. Mounted upon the shaft 104 within the housing 106 is a bevel gear 108, which is adapted to engage with a second bevel gear 109 carried by a shaft 110 extending through bearing support 111 into the housing 106.

The shaft 110 extends rearwardly through the V-shaped depression formed by the walls 44 and 45, having bearing support at 112 in the forward wall 90 of the fan housing, and having additional bearing support upon the rear wall of the fan housing, as indicated at 113. Mounted upon the shaft 110 between the wall 90 and the housing 106 are a pair of sprocket pulleys 114 and 115 which are suitably keyed or otherwise secured to the shaft.

These sprocket pulleys 114 and 115 are adapted to be connected to sprockets 116 and 117 through the sprocket chains 118 and 119 respectively. The sprockets 116 and 117 are keyed upon their respective shafts 120 and 121, which have one end thereof suitably supported in bearing supports 122 formed upon the casting 85, and the other end of which extends into the housings 98.

Disposed at the forward ends of the shafts 120 and 121 are bevel gears 123, which are adapted to engage the gears 100 carried by the beaters 93. The shafts also have bearing support in the housing 98. It is thus apparent that the beaters 94 are driven by means of the shaft 110 through the gear connections 108 and 109 and through the gears 101 and 103. The beaters 93 are driven through their shafts 95 by means of the sprockets 114 and 115 carried by the shaft 110. This provides rotation of shafts 120 and 121 which are geared by means of gears 123 and gears 100 to the shafts 95 of beaters 93. It is thus apparent that the shaft 110 is adapted to rotate all of the beater shafts 95 of the vertically extending beaters 93 and 94.

Considering now Figures 1 and 3, the horizontally extending lower beater 92 is carried in suitable bearing supports formed integral with the casting 70. These supports are indicated by the numerals 125 and 126. The shaft of the beater 92 extends at one end into a gear case housing 128, and is provided within the housing with a bevel gear 129 similar to the gears 101 and 100 described in connection with the beaters 93 and 94. This gear is adapted to mesh with a second bevel gear 130 carried upon shaft 131 extending through the gear case housing and having bearing supports in the bearing 132 formed integral with the casing 70. The other end of the shaft 131 extends rearwardly of the casing and is provided, at its end, with a sprocket wheel 134 which is keyed or otherwise suitably secured to the shaft 131. The beaters are provided with blade portions extending normal to the axis of the shafts 95, and which are secured to the shafts by means of a plurality of bracket members, indicated generally by the numeral 135. In the embodiment shown in the present application, each of the blades of the beaters is disclosed as being generally rectangular in shape, and lying in a single plane. I do not intend to be limited, however, to this particular type of beater blade, since the blades may be spiraled about the shaft, or may be corrugated blades or blades of a generally herring-bone construction, if desired. For example, in situations where the snow is rather heavy and packs readily, the corrugated or spiralled type of blade may be preferable to a straight type of blade which might be used in connection with dry, powdery snow.

Considering now Figures 4 and 5, the driving power for the rotating fan and for the beater blades will now be described. This power is derived from the auxiliary motor 34, and is transmitted through the propeller shaft 140, shown in Figure 4, to a universal joint connection indicated generally at 141. This connection is of the usual type and needs no detailed description. From the connection 141, a propeller shaft 142 extends through the transmission casing 37 and at its extending end is provided with a pair of sprockets indicated at 143 and 144. The sprocket 143 is adapted to receive a sprocket chain 145 connected to the sprocket 134 carried by shaft 131 for operating the beater 92. The sprocket 144 is connected, through sprocket chain 146, to sprocket wheel 147 carried at the outer end of shaft 110. Through this connection, the shaft 110 is adapted to drive the beaters 93 and 94. By properly proportioning the relative sizes of the sprockets 134, 147, 114 and 115, the beaters may be rotated at any desired speed, which may be a uniform speed for all beaters, or, if desired, the beaters 93 may be rotated at a different speed than the beaters 94, with the beater 92 being rotated either at the same or at a different speed from either of the beaters 93 or 94. This speed control is optional, since for different situations the speed of rotation of the beaters may be varied. The shaft 142 is adapted to have bearing support in a boss 148 carired by the casting 75.

As shown in Figure 5, disposed directly above and in alignment with the shaft 142 is a second shaft 150, which extends through a suitable roller bearing suport 151 carried by a vertically extending portion of the casting 75, comprising a web portion 152' extending between the upwardly extending portion 75 of the casting, the shaft 150 extending into the fan housing and serving as a mounting for the impeller 41. Disposed upon the shaft 150 is a large spur gear 152, which is adapted to be rotated by means of a gear 153 splined upon shaft 142. The gear 153, as shown in Figure 4, is provided with a collar portion 154 which is adapted to receive the lower portion 155 of a reversing lever 156 mounted upon a boss 157 of the cover plate 158 of the transmision casing 37. Through the provision of the lever 156, the gear 153 can be moved forwardly, as viewed in Figure 4, to engage with a gear 159 carried upon a counter shaft 160. This gear 159 is formed integral with a second or idler gear 161 which at all times meshes with gear 152. In this manner, the gear 152 of the impeller shaft 150 can be rotated either directly by gear 153, as shown in Figure 4, or the lever 156 can be rocked rearwardly to move the gear 153 forwardly to engage with gear 159 to drive the shaft 150 in a reverse direction through gears 161 and 152. The clutch lever 33 which controls the clutch of the auxiliary engine 34 through control rod 35 and clutch rod 36, is adapted to throw the drive shaft 140 out of connection with the engine while such a reversing shift is made.

The outer end of shaft 150 is journaled in a roller bearing housing indicated generally at 163 and formed in the rear end of the transmission casing 37. It is thus apparent that the shaft 150, which rotates the impeller 41, can be rotated in either direction by operation of the lever 156, without affecting the operation of the beaters 92, 93, and 94. As will be noted, these beaters rotate in opposite directions, the beaters 93 rotating in a direction opposite to the rotation of the beaters 94, as shown by the arrows in Figures 2 and 3. The beater 92 rotates in a clockwise direction, as viewed in Figure 1.

It is to be understood that the transmission case 37, and the gear casings 98, 106, and 128, are adapted to be filled with grease of suitable consistency, and to be tightly closed to prevent the admission of snow, ice, water or the like. The gear cases 98 and 106 are mounted, by means of a plurality of bolts or the like, to the plate 86 of the casting 85, there being a gasket interposed between the casing and the casting in order to secure a tight fluid-proof seal therebetween. The same is true of the gear case 128 which is secured to a portion of the casting 70 in like manner.

Figure 6:
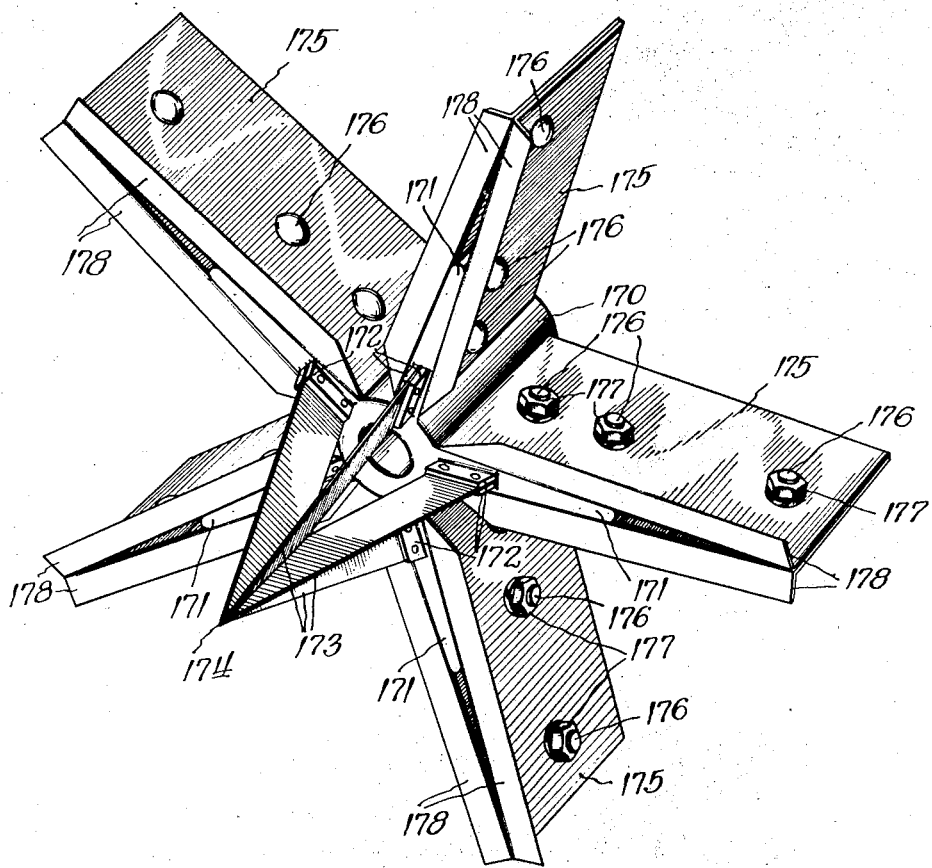
Figure 6 is a perspective view of the rotating fan employed in the snow plow.

Considering in detail Figure 6, which discloses an enlarged perspective view of the impeller 41, this impeller comprises a hub section 170, which is provided with integral radially extending finger members 171. Formed upon the finger members 171 are a plurality of axial extensions 172 which are adapted to receive therebetween blade members 173 terminating at a common point 174. The blade members are welded or otherwise suitably secured together at 174, and their inner ends are secured to the extending brackets 172 by means of bolts, rivets, or the like.

Disposed upon opposite sides of each of the finger members 171 are impeller blades 175, which blades are secured together by means of a plurality of bolts 176, or other suitable securing means. The blades 175 are thus demountably mounted upon the finger members 171 of the hub 170, and can be removed therefrom by removing the bolts and associated nuts 177. Each of the blades 175 is provided with a normally extending cutting edge 178, and the blades can be removed from the hub casting 170 and the integral tip portions 171 to facilitate sharpening of these cutting edges. By the provision of these cutting edges, the rotation of the impeller or fan is adapted to cut any packed snow which the fan may encounter and to break it up into finely divided portions which may be blown out through the openings 46 or 47.

It is thus apparent that I have provided a snow plow having numerous features of construction which cooperate to produce a plow mechanism which is capable of completely removing banked snow for a distance equal to the width of the plow, and for squarely cutting off side banks to provide a clean cut path through the snow. The drum for the fan, being capable of discharging to either side of the plow, can be so manipulated as to discharge the snow at any desired point on either bank, depending upon the direction of the wind and the speed of rotation of the fan 41. The provision of the beaters, which in this embodiment has been shown to be five in number, although this number may be varied, depending upon the conditions which are met, serves to break up the snow and deliver it to the fan in finely divided condition, while the provision of the cutting edges upon the fan and the blades extending forwardly therefrom, serve to cut up any snow that may pass the beaters. The diverging side walls serve as guides for directing the snow into the fan housing, and cooperate with the beaters to provide a steady flow of snow into the fan housing for delivery out of the outlets 46 or 47. The reversing gear provided for the impeller allows the snow to be blown out through either side of the drum, depending upon conditions. It is thus apparent that the impeller, because it receives only snow which has previously been broken into finely divided portions, does not require as much power as an impeller which bites directly into packed snow, and therefore the power requirements of the auxiliary engine 34 can be considerably decreased. Also, the power requirements of the truck or other motive power for the plow can be decreased, because of the beaters which tend to drive the snow into the plow, thus not requiring the plow to be forced into banked snow.

The provision of the wheels 73 beneath the plow housing provides means for spacing the tip portion 71 of the plow the proper distance from the ground so that it will not dig into the ground when the plow and cab are in their normal position. The raising or lowering of the cab and plow permits the plow to ride over obstructions, the wheels tending to space the forwardly extending portion of the plow above the ground when the cab is in lowermost position, and being so proportioned that, even upon a crowned roadway, the tip 71 will still be kept from contact with the ground.

The disposition of all the operating mechanism in an enclosed cab mounted at the rear end of the truck chassis, whereby one operator may control the movement of the truck, the operation of the plow, and the steering of the truck, is believed to be broadly new. The provision of an idler sprocket gear in connection with the truck transmission provides for three reverse speeds and one forward speed, as compared with three forward speeds and one reverse speed employed in the present type of truck.

While I have shown and described a preferred embodiment of my invention, I do not intend to be limited to the exact details as shown and described, since there are many modifications and changes in construction which can be made in order to cope with conditions which are met with in the use of a device of this type, without departing from the scope and spirit of the invention, and I therefore intend to be limited only as defined by the subject matter of the appended claims.

I claim:

1. In a device of the class described, a snow plow adapted to be rigidly secured to a vehicle cab comprising a housing, a rotating fan in said housing, a plurality of diverging side walls leading from said housing, rotating beaters mounted adjacent said side walls and extending normal to the axis of rotation of said fan, a V-shaped depression in said housing, outlets from said housing on each side of said depression, and means for controlling the size and direction of each of said outlet openings.

2. In a device of the class described, a fan housing, oppositely disposed outlets for said housing, means for independently controlling the opening of each of said outlets, an impeller mounted in said housing, a plurality of vertically extending beaters adjacent said impeller for cutting and breaking up packed snow, adjacent beaters revolving in opposite directions, each of said beaters having a plurality of cutting edges, and gear connections carried by said housing and engaging said beaters for revolving said beaters, said gear connections being driven from a single shaft.

3. In combination, a snow plow adapted to have a plurality of beaters, gears carried at the ends of said beater shafts, corresponding gears carried upon stub shafts, a transmission casing, a drive shaft extending through said casing, a sprocket carried at the free end of said shaft, a second shaft having a corresponding sprocket connected to said first sprocket, and means for connecting said second shaft to said stub shafts for rotating the same.

4. In a snow plow of the class described, a truck chassis having an engine, a cab mounted on said chassis and having an auxiliary engine, a rotatable impeller mounted in said plow, a plurality of beaters connected to be operated from a single shaft, a transmission casing, a drive shaft extending from said auxiliary engine through said casing, a second shaft for operating said beaters, means on the free end of said shaft connected to said second shaft for driving the same, a shaft for said impeller extending into said casing, a gear on said impeller shaft, a gear splined on said drive shaft, and means for driving said impeller shaft in either direction through said drive shaft.

5. In combination, a snow plow comprising a housing, an impeller in said housing, a lower defining wall comprising a scoop-shaped casting secured to said housing, bearing supports formed in said casting, wheels carried in said bearing supports, a laterally extending beater supported by said casting, and means on said casting for supporting a plurality of vertically extending beaters.

6. The combination with a truck having an enclosed cab mounted thereon, of a snow plow including a rotary impeller, a housing for said impeller, side walls for said housing pivotally secured thereto and adapted to swing away from said housing, arms secured to said walls, pivot means secured to said frame, and means for rotating said arms about said pivot means to swing said walls, said means having a portion extending into the interior of said cab.

7. The combination with a truck having an enclosed cab mounted thereon, of a snow plow secured to said cab and including a rotary impeller, a housing for said impeller, a top wall for said housing having pivotally mounted doors at opposite ends thereof, said doors cooperating with the side walls of said housing to maintain said housing closed, and means in the interior of said cab for adjusting said doors about said pivots to define outlet openings for said housing at either side thereof.

8. In combination, a vehicle chassis, a cab mounted thereon, a snow plow housing rigidly secured to said cab, an impeller comprising a hub portion having a plurality of extending fingers about its periphery, blades secured to each side of each of said fingers and cutting edges on each of said blades, means for rotating said impeller, and gear transmission means within said cab for controlling the direction of rotation thereof.

9. In combination, a vehicle chassis, a cab mounted thereon, a snow plow housing comprising a rear wall, a lower defining wall extending normal thereto, side walls pivoted adjacent their lower ends and adapted to swing outwardly, and an inverted W-shaped top wall having its extending legs pivotally mounted at their upper ends to cooperate with said side walls in defining oppositely extending outlets for said housing, means in said cab for controlling movement of said side walls, and means in said cab for selectively uncovering said outlets.

CALMER E. CHRISTOPHERSON.